US007711360B2

(12) United States Patent
Dundar et al.

(10) Patent No.: US 7,711,360 B2
(45) Date of Patent: May 4, 2010

(54) RADIO FREQUENCY PLANNING WITH CONSIDERATION OF INTER-BUILDING EFFECTS

(75) Inventors: Baris Dundar, San Pablo, CA (US); Raymond Rui-Feng Liao, Pleasanton, CA (US)

(73) Assignee: Siemens Aktiengesellschaft, München ( * ) Notice: Subject to any disclaimer, the term of this patent is extended or adjusted under 35 U.S.C. 154(b) by 601 days.

(21) Appl. No.: 11/361,913

(22) Filed: Feb. 23, 2006

(65) Prior Publication Data

US 2007/0106717 A1    May 10, 2007

Related U.S. Application Data

(60) Provisional application No. 60/734,845, filed on Nov. 8, 2005.

(51) Int. Cl.
  *H04W 24/00* (2009.01)
(52) U.S. Cl. ..................................................... 455/423
(58) Field of Classification Search ................. 455/423, 455/424, 422.1
  See application file for complete search history.

(56) References Cited

U.S. PATENT DOCUMENTS

| | | | |
|---|---|---|---|
| 5,394,522 A | 2/1995 | Sanchez-Frank et al. | |
| 5,450,615 A | 9/1995 | Fortune et al. | |
| 5,640,002 A | 6/1997 | Ruppert et al. | |
| 5,686,705 A | 11/1997 | Conroy et al. | |
| 5,732,077 A | 3/1998 | Whitehead | |
| 5,949,988 A | 9/1999 | Feisullin et al. | |
| 5,953,669 A * | 9/1999 | Stratis et al. ................. | 455/449 |
| 6,059,842 A | 5/2000 | Dumarot et al. | |
| 6,119,009 A | 9/2000 | Baranger et al. | |
| 6,317,599 B1 | 11/2001 | Rappaport et al. | |
| 6,330,429 B1 | 12/2001 | He | |
| 6,336,035 B1 | 1/2002 | Somoza et al. | |
| 6,337,688 B1 * | 1/2002 | Berstis ........................ | 345/473 |
| 6,338,031 B1 * | 1/2002 | Lee et al. ....................... | 703/13 |

(Continued)

FOREIGN PATENT DOCUMENTS

EP    1175115 A2    1/2002

(Continued)

OTHER PUBLICATIONS

H. He J. McDowell & M. Conroy: "asc coordinate transformation the pixlib library, II" Astronomical Data Analysis Software Systems VII, APS Conferences Series; vol. 145, 1998; pp. 1-4.

(Continued)

*Primary Examiner*—Nick Corsaro
*Assistant Examiner*—Vladimir Magloire
(74) *Attorney, Agent, or Firm*—Donald B. Paschburg

(57) ABSTRACT

A method includes providing a first set of location data using a first coordinate system that corresponds to a first building and a second set of location data using a second coordinate system that corresponds to a second building. A third set of location data is generated from the first and second sets of location data by converting the first set of location data from the first coordinate system to a third coordinate system and converting the second set of location data from the second coordinate system to the third coordinate system.

23 Claims, 5 Drawing Sheets

U.S. PATENT DOCUMENTS

| | | | |
|---|---|---|---|
| 6,360,107 B1 | 3/2002 | Lin et al. | |
| 6,393,290 B1 | 5/2002 | Ufongene | |
| 6,500,123 B1 * | 12/2002 | Holloway et al. | 600/443 |
| 6,522,888 B1 | 2/2003 | Garceran et al. | |
| 6,654,612 B1 | 11/2003 | Avidor et al. | |
| 6,759,979 B2 * | 7/2004 | Vashisth et al. | 342/357.13 |
| 6,885,191 B1 | 4/2005 | Gleman | |
| 7,299,168 B2 * | 11/2007 | Rappaport et al. | 703/20 |
| 2004/0181374 A1 | 9/2004 | Rappaport et al. | |
| 2007/0106717 A1 | 5/2007 | Dundar et al. | |
| 2007/0197225 A1 | 8/2007 | Dundar et al. | |
| 2007/0198227 A1 | 8/2007 | Dundar et al. | |
| 2008/0075051 A1 | 3/2008 | Dundar | |

FOREIGN PATENT DOCUMENTS

| | | |
|---|---|---|
| WO | WO 98/03025 A1 | 1/1998 |
| WO | WO 99/30448 A1 | 6/1999 |
| WO | WO 02/10942 A1 | 2/2002 |

OTHER PUBLICATIONS

Iwama, T. et L.: "Investigation of Propagation Characteristics above 1 GHz for Microcellular Land Mobile Radio"; May 6, 1990; pp. 396-400.

Search Report for PCT/US2006/043724, dated May 18, 2007.

U.S. Appl. No. 11/624,167, Dundar, et al.

Florence Sagnard, "The Matlab Graphical Interface ECAMO", Internet Publication, (online) Jul. 5, 2002, Retrieved from the internet: http://www.univ-mlv.fr/crmo/interfaces/ECAMO/fiche_ecamo_0801.pdf.

William C. Y. Lee: "Wireless and Cellular Communication (part)" Book, Oct. 22, 2005, pp. 396-402.

K. E. Oliver: "Introduction to Automatic Design of Wireless Networks"; ACM Crossroads 11.4: Mobile and Wirelss Networking, (online) Jun. 2005, Retrieved from the internet: http://www.acm.org/crossroads/xrds11-4/automaticdesign.html.

G. Bianchi, "Performance Analysis of the IEEE 802.11 Distributed Coordination Function", IEEE Journal of Selected Areas in Communication, 18(3), Mar. 2002, pp. 535-547.

A. Veres, et al., "Supporting Service Differentiation in Wireless Frame Networks Using Distributed Control", IEEE Journal of Selected Areas in Communication, 19(10), Oct. 2001, pp. 2081-2093.

Steven J. Fortune, et al., "Wise Design of Indoor and Outdoor Wireless Systems: Practical Computation and Optimization", IEEE Computational Science & Engineering, Spring 1995, Lucent Bell Labs., pp. 58-68.

* cited by examiner

RADIO FREQUENCY PLANNING WITH CONSIDERATION OF INTER-BUILDING EFFECTS

CROSS-REFERENCE TO RELATED APPLICATION

This application claims priority under 35 U.S.C. §119 to U.S. Provisional Patent Application No. 60/734,845, entitled "Interference-Aware RF Planning System for Campus-Wide Wireless Networks", filed in the name of Dundar et al. on Nov. 8, 2005, the contents of which are hereby incorporated by reference in their entirety for all purposes.

BACKGROUND

Radio frequency (RF) planning is frequently a part of plans to deploy a large-scale wireless local area network (LAN). The purpose of RF planning is to ensure an adequate quality of RF signal coverage across the area in which the wireless LAN is to be deployed. Data to be considered for RF planning includes signal-to-noise ratio (SNR) and signal-to-noise-plus-interference ratio (SINR).

Conventional RF planning efforts generate data that indicates the locations of building features, relevant objects, and planned and/or existing sources of RF signals within a building. However, conventional RF planning may fail to take into account potential for interference from RF sources in other buildings.

SUMMARY

The present invention generally relates to planning and/or management of wireless communication networks. In particular, apparatus and methods are presented for a system for RF planning and/or communication system management across a campus that includes a plurality of buildings.

According to some embodiments, a method, an apparatus and an article of manufacture that includes a computer usable medium containing computer readable program code are provided. The method steps and/or the steps performed by the apparatus and/or the steps called for by the computer readable program code include providing or receiving a first set of location data using a first coordinate system that corresponds to a first building, and providing or receiving a second set of location data using a second coordinate system that corresponds to a second building. The second coordinate system is different from the first coordinate system and the second building is different from the first building. The method steps and/or the steps performed by the apparatus and/or the steps called for by the computer readable program code include generating a third set of location data from the first and second sets of location data by: (a) converting the first set of location data from the first coordinate system to a third coordinate system, and (b) converting the second set of location data from the second coordinate system to the third coordinate system. The third coordinate system is different from the first and second coordinate systems.

In some embodiments, the first location data includes data indicative of a location in the first building of at least one source of RF signals, and the second location data includes data indicative of a location in the second building of at least one source of RF signals. The third set of location data may be used as an input to an RF planning function. The RF planning function may effectively be performed across a campus that includes the first and second buildings.

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, RF planning information is collected building-by-building in the buildings of an office park campus or the like. The building-by-building information is then integrated together by conversion from individual building coordinate systems to a campus-wide coordinate system. The resulting RF planning information that has been converted to the campus-wide coordinate system may then be used as an input to an RF planning process that is able to take inter-building interference into account. In addition or alternatively, the information in the campus-wide coordinate system may be used for real-time management of a wireless LAN or other wireless communication system that extends from building to building within the campus.

Figure 1:
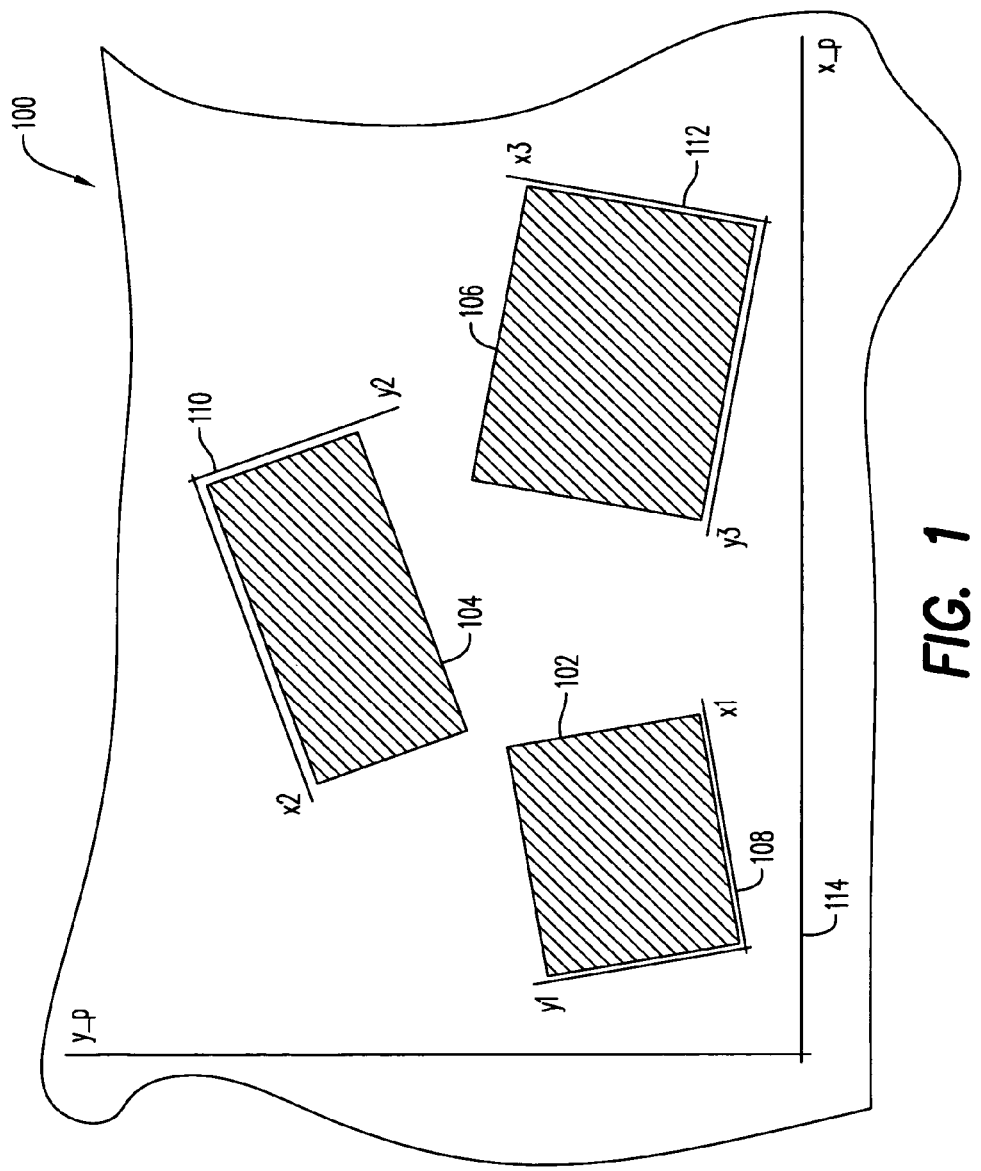
FIG. 1 is a schematic plan view of a campus for which RF planning is to be performed.

FIG. 1 is a schematic plan view of a campus 100 for which RF planning is to be performed. The campus 100 includes buildings indicated by reference numerals 102, 104, 106. (In other examples, the campus may have just two buildings or may have four or more buildings.) The campus may be a campus of corporate buildings, government buildings, medical center buildings, not-for-profit institution buildings, or a college or university campus. Each of the buildings has a respective building coordinate system used for collecting and/or defining RF planning data relevant to the particular building. In particular, building 102 has coordinate system 108, building 104 has coordinate system 110, and building 106 has coordinate system 112. Each building coordinate system includes an origin point and a set of three mutually orthogonal axes that pass through the origin point. The axes may consist of two horizontal axes ("x" and "y") at right angles to each other and a vertical (height) "z" axis. (In the drawing, the vertical/height "z" axis is not shown.) Although the building coordinate systems are shown slightly spaced from their respective buildings for purposes of illustration, in practice the origin point of each building coordinate system may coincide with a corner of the respective building, and each of the horizontal ("x" and "y") axes may coincide with an outer surface of a wall of the respective building. The building coordinate systems may be selected and/or established in accordance with conventional practices for generating RF planning data within a building.

In addition, in accordance with some embodiments, a campus-wide or "plant" coordinate system 114 may be established. The plant coordinate system 114 includes a plant origin point and a set of three mutually orthogonal axes that pass through the plant origin point. The axes of the plant coordinate system include two horizontal axes "x_p" and "y_p" at right angles to each other and a vertical (height) "z_p" axis which is not shown. In some cases the plant coordinate system may be selected to coincide with one of the building coordinate systems.

Figure 2:
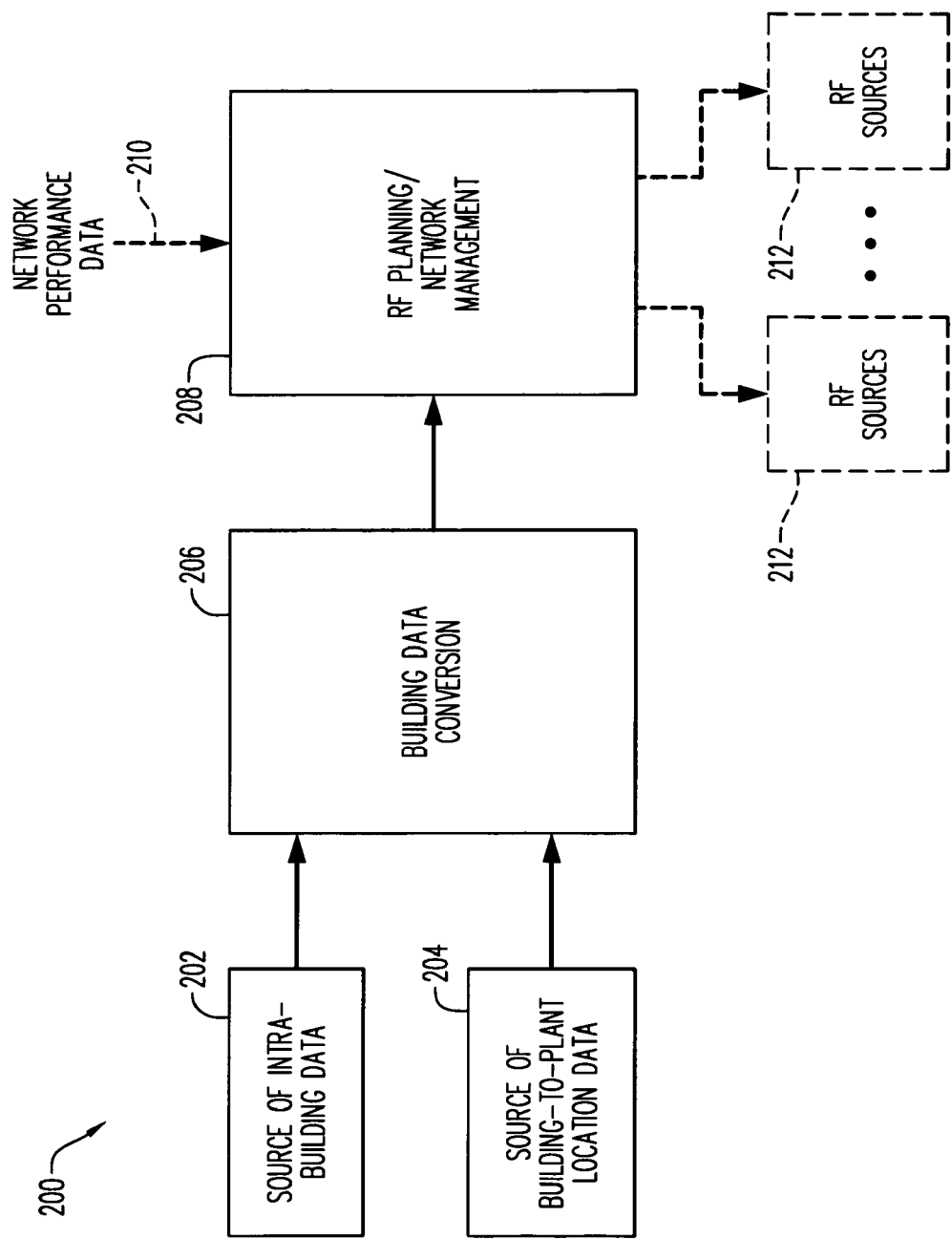
FIG. 2 is a functional block diagram of a system for performing RF planning and/or network management in accordance with some embodiments.

FIG. 2 is a functional block diagram of a system 200 for performing RF planning and/or network management in accordance with some embodiments. Block 202 represents a source of RF planning data collected on an intra-building basis for each of the buildings 102, 104, 106 of the campus 100. The intra-building RF planning data may be collected in a conventional manner and may include locations, relative to the respective building coordinate system, of each RF source or planned RF source (e.g., access points) within each building. The intra-building RF planning data may also include, in accordance with conventional practices, the location and composition of walls and other features of the building in question.

Block 204 represents a source of data that indicates a spatial relationship between each building coordinate system and the plant coordinate system. Block 206 represents processing which is performed to convert the intra-building RF planning data to the plant coordinate system, based on the intra-building RF planning data from 202 and the building coordinate to plant coordinate data from 204. Block 208 represents processing to perform at least one of campus-wide RF planning and campus-wide real-time network management, based in each case on the RF planning data in the plant coordinate system, as derived by the building data conversion block 206. If real-time network management is performed, block 208 may receive real-time network performance data, as indicated at 210, and may control real-time operation of RF sources 212, such as access points (not separately shown) located at various points in the buildings 102, 104, 106 and the campus 100.

Figure 3:
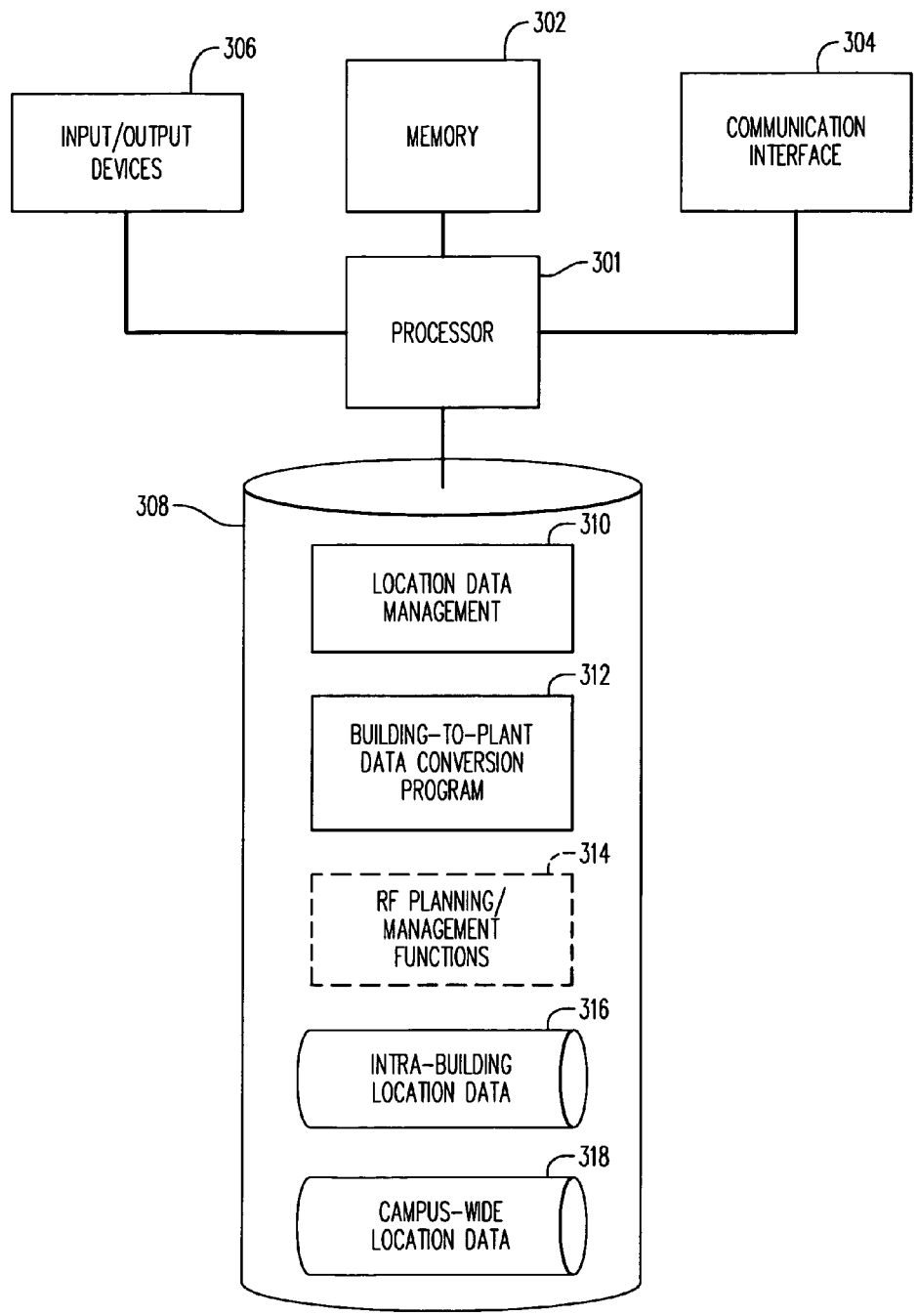
FIG. 3 is a block diagram of a computer that may form at least a part of the system of FIG. 2.

FIG. 3 is a block diagram of a computer 300 as provided in accordance with some embodiments. The computer 300 may, for example, implement some or all of the functions of blocks 206, 208 of FIG. 2. The computer 300 may, in some embodiments, be entirely conventional in terms of its hardware aspects. For example, the computer 300 may, in its hardware aspects and some of its software, be a conventional personal computer. As indicated in this paragraph and discussed further below, software may be provided to control the computer 300 in accordance with aspects of the present invention, and data may be stored and manipulated in the computer 300 in accordance with aspects of the present invention.

The computer 300 may include one or more processors 301, which may be a conventional microprocessor or microprocessors. Also included in computer 300 are memory 302, one or more communication interfaces 304, and input/output devices 306, all of which are in communication with the processor 301. The memory 302 may be, in some embodiments, one or more of RAM, ROM, flash memory, etc., and may serve as one or more of working memory, program storage memory, etc. The communication interfaces 304 allow the computer 300 to exchange data with data sources (FIG. 2). (In addition or alternatively, some or all of the intra-building data and the building coordinate system to plant coordinate system data may be provided to the computer 300 via one or more storage devices such as floppy disks, CD-ROMs, etc.) The I/O devices 306 may include one or more conventional devices such as displays, printers, keyboards, a mouse, a trackball, etc.

Also included in the computer 300, and in communication with the processor 301, is a mass storage device 308. Mass storage device 308 may be constituted by one or more magnetic storage devices, such as hard disks, one or more optical storage devices, and/or solid state storage. The mass storage 308 may store software 310 which controls the computer 300 to store and manage RF planning and/or network management data, in some or all of the building coordinate systems and the plant coordinate system. The mass storage 308 may also store software 312 to convert intra-building RF planning data provided by source 202 (FIG. 2) to the plant coordinate system, in a manner to be described further below. The mass storage 308 may also store software 314 which enables the computer 300 to perform RF planning functions and/or real-time RF network management. In addition, other software, which is not represented in the drawing, may be stored in the mass storage 308, including operating system software and/or other applications that allow the computer 300 to perform other functions in addition to building data conversion and/or RF planning/network management. In practice the functions described herein may all be performed in one computer or may be divided among two or more computers that may be in communication with each other and/or may exchange data via removable memory devices such as floppy disks, CD-ROMs, etc. It will be appreciated that all of the software referred to above may be temporarily stored in memory 302 and fetched instruction-by-instruction by the processor 301 to program the processor 301. The software may also be referred to as "program instructions" or "computer readable program code".

Still further, the mass storage 208 may store intra-building RF planning/management data 316 and campus-wide (plant coordinate system) RF planning/management data 318.

Figure 4:
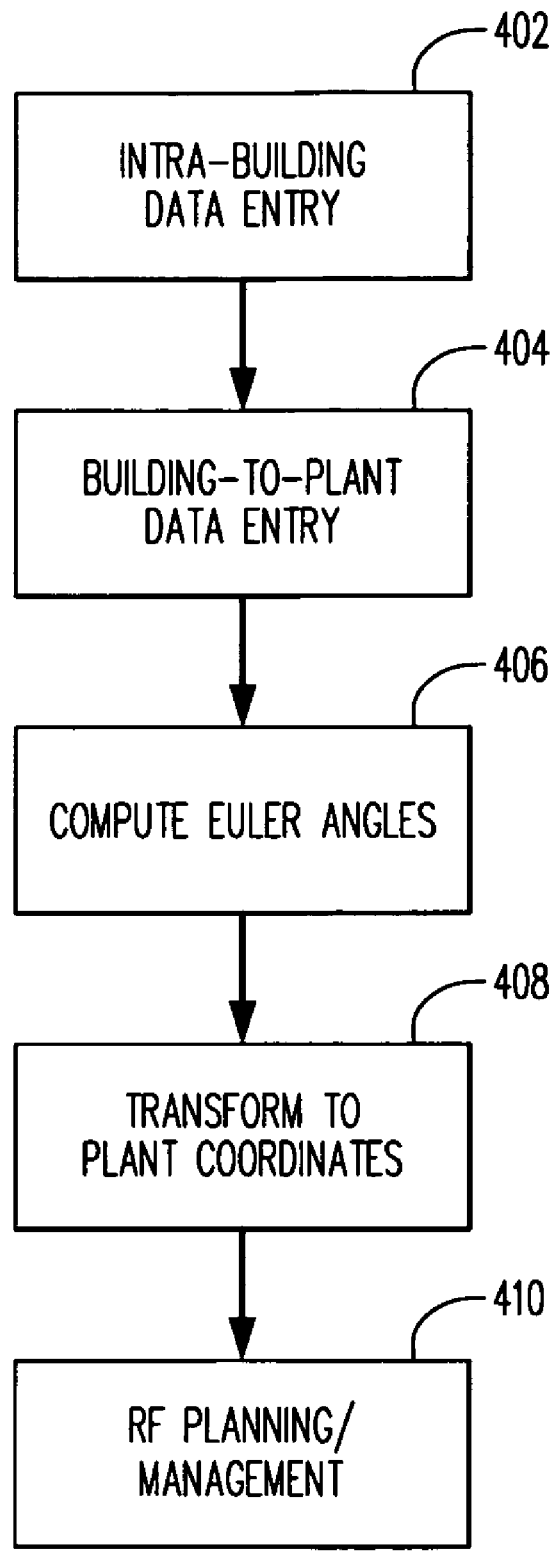
FIG. 4 is a flow chart that illustrates a process that may be performed, in accordance with some embodiments, in the system of FIG. 2.

FIG. 4 is a flow chart that illustrates a process that may be performed, in accordance with some embodiments, in the system 200 of FIG. 2 and/or at least partially in the computer 300 of FIG. 3.

At 402 in FIG. 4, the intra-building RF planning data (also referred to as "location data") may be provided as an input to the system 200 and/or the computer 300. The intra-building RF planning data may have been gathered building-by-building in accordance with conventional practices and on the basis of the individual building coordinate systems for each building. In some embodiments, the intra-building RF planning data may be gathered using one or more portable computing devices (e.g., a notebook computer or computers) and may be uploaded to the computer 300 for further processing. Thus, such portable computing device or devices (which are not otherwise shown) may constitute the source 202 (FIG. 2) of intra-building RF planning data.

Continuing to refer to FIG. 4, at 404 data is gathered or provided that indicates the spatial relationship between the plant coordinate system 114 (FIG. 1) and each of the building coordinate systems 108, 110, 112. This data may be gathered/sourced/provided in a number of different ways. For example, this data may be included in and/or derived from a map of the campus 100. The campus map may be available in the form of a CAD (computer aided design) drawing, one or more satellite images and/or cartographic map data. Such data may be communicated to the computer 300 and/or loaded into the computer 300 on a storage medium.

Alternatively, or in addition, operations may be performed to generate the building-to-plant location data. Such operations may utilize a hand-held GPS (global positioning system) enabled device to generate GPS (longitude/latitude/height) data indicative of the points of origin and direction of axes (as indicated, e.g., by unit vectors) for each of the coordinate systems 108, 110, 112, 114. For example, GPS data may be gathered at the origin point and along each axis for each of the coordinate systems. The hand-held device (not shown) may be operative to convert the GPS data into Cartesian coordinate data in accordance with a conventional algorithm, and/or such conversion may be made by the computer 300/processing block 206.

At 406, the processing block 206/computer 300 computes the Euler angles (yaw, pitch, roll) between the plant coordinate system unit vector and each of the building coordinate system unit vectors. According to the so-called x-convention, (a) the yaw angle is the rotation around the z axis by $\phi$ degrees, (b) the pitch angle is the rotation around the x axis by $\theta$ degrees, and (c) the roll angle is the rotation around the z axis by $\psi$ degrees.

To calculate the Euler angles for a given building coordinate system relative to the plant coordinate system, the building coordinate system is translated so that it is co-located with the plant coordinate system, by vector subtraction, for example. Then the Euler angles are calculated in accordance with a known algorithm, and the building coordinate system is re-translated to its original location.

At 408, the intra-building RF planning data for each building is transformed from the respective building coordinate system to the plant coordinate system. This is done by multiplying each coordinate vector in a building coordinate system by the rotation operator for the building operating system. The rotation operator is based on a 3×3 coordinate transform matrix A for the particular building coordinate system as given below:

$$\begin{pmatrix} a11 & a12 & a13 \\ a21 & a22 & a23 \\ a31 & a32 & a33 \end{pmatrix}$$

where:
a11=$\cos\psi.\cos\phi - \cos\theta.\sin\phi.\sin\psi$
a12=$\cos\psi.\sin\phi + \cos\theta.\cos\phi.\sin\psi$
a13=$\sin\psi.\sin\theta$
a21=$\sin\psi.\cos\phi - \cos\theta.\sin\phi.\cos\psi$
a22=$\sin\psi.\sin\phi + \cos\theta.\cos\phi.\cos\psi$
a23=$\cos\psi.\sin\theta$
a31=$\sin\theta.\sin\phi$
a32=$\sin\theta.\cos\phi$
a33=$\cos\theta$ A different transformation matrix is used for converting the intra-building data for each building.

In some embodiments the conversion calculations may be performed in the computer 300. In other embodiments, at least some the conversion calculations may be performed in a handheld computing device (not separately shown) that may be used to develop the building-to-plant location data.

A linear transformation of the coordinates is not needed since all of the building coordinates are with respect to the building origin. After the coordinate conversion, the origin point of the building will have a new set of coordinates in the plant coordinate system and so will all of the other points within the building.

At 410, the RF planning data, having been transformed from the individual building coordinate systems to the plant coordinate system, is used as input data for one or both of an RF planning function or a real-time network management function. It will be appreciated that the RF planning data, now in the plant coordinate system, may represent locations of RF sources (or planned sources) such as access points, and may also locate, in the plant coordinate system, features such as walls, etc., of all the buildings of the campus.) In the case of the RF planning function, the RF planning may be performed in essentially a conventional manner, except that location data in the plant coordinate system is used for the planning, and the planning may be performed on a campus-wide basis, taking into account potential for interference between buildings. The RF planning function may produce the optimum network configuration while keeping interference from neighboring buildings to a minimum. One potential application of such an RF planning function may be to plan a wireless LAN to cover all of the buildings of the campus 100.

Figure 5:
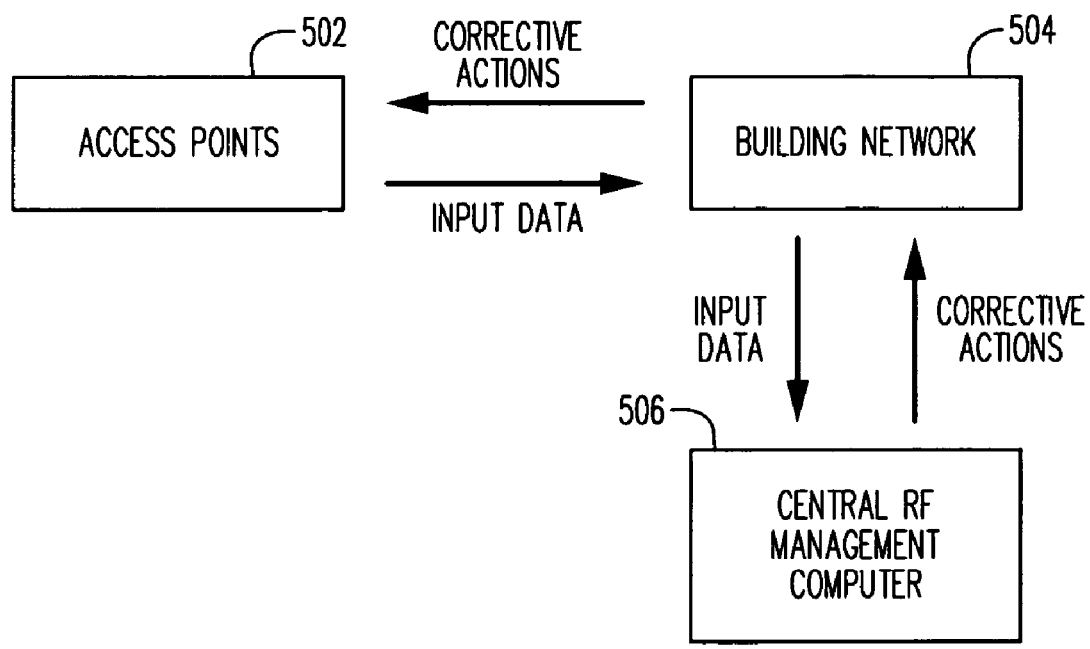
FIG. 5 is a schematic representation of an RF network management process that may be performed in some embodiments.

FIG. 5 is a schematic representation of an RF network management process that may be performed in some embodiments.

In this RF network management process, access points 502 provide to their building network 504 real-time data that indicates current network performance such as SNR and SINR. The performance data is uploaded from the building network 504 (which may be, or be part of, a campus-wide network) to the central RF management computer 506 (which may, but need not, be the same as computer 300-FIG. 3). Utilizing RF planning/location data in the plant coordinate system, the central RF management computer may, when necessary, prescribe corrective actions to address current problems in network performance. Possible corrective actions may include changing operating channels currently used by one or more access points, increasing or decreasing transmit power levels of one or more access points or adjusting data rates provided by one or more access points. The central RF management computer downloads commands for corrective actions to the building network 504 and via the building network 504 to one or more of the access points 502. The corrective actions may be implemented in real-time in response to changing network conditions.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method comprising: providing to a computer a first set of location data using a first coordinate system that corresponds to a first building, said location data indicative of respective locations of objects within the first building;

providing to the computer a second set of location data using a second coordinate system that corresponds to a second building, said second coordinate system different from said first coordinate system, said second building different from said first building, said second set of location data indicative of respective locations of objects within the second building;

generating a third set of location data from said first and second sets of location data by:

converting, via the computer, the first set of location data from the first coordinate system to a third coordinate system by:

computing Euler angles for the first coordinate system relative to the third coordinate system by translating the first coordinate system so that it is co-located with the third coordinate system using vector subtraction; and transforming the location data indicative of respective locations of objects within the first building from the first coordinate system to the third coordinate system by multiplying one or more coordinate vectors associated with the first coordinate system by a first rotation operator associated with the first coordinate system and converting, via the computer, the second set of location data from the second coordinate system to the third coordinate system by:

computing Euler angles for the second coordinate system relative to the third coordinate system by translating the second coordinate system so that it is co-located with the third coordinate system using vector subtraction; and transforming the location data indicative of respective locations of objects within the second building from the second coordinate system to the third coordinate system by multiplying one or more coordinate vectors associated with the second coordinate system by a second rotation operator associated with the first coordinate system, the third coordinate system being different from the first and second coordinate systems, said third set of location data indicative of respective locations of said objects within the first building and within the second building in relation to said third coordinate system, wherein: the first set of location data includes data indicative of a location in the first building of at least one source of radio frequency (RF) signals; and the second set of location data includes data indicative of a location in the second building of at least one source of RF signals, further comprising: using the third set of location data as an input to an RF planning function; and adjusting a transmit power level of the at least one RF source based on the third set of location data.

2. A method according to claim 1, wherein the first, second and third coordinate systems are all Cartesian coordinate systems.

3. A method according to claim 2, wherein: the first coordinate system has a first origin; and the second coordinate system has a second origin different from the first origin.

4. A method according to claim 3, wherein the third coordinate system has a third origin that is different from the first and second origins.

5. A method according to claim 1, wherein: said converting the first set of location data from the first coordinate system to the third coordinate system includes applying a first transformation matrix to the first set of location data; and said converting the second set of location data from the second coordinate system to the third coordinate system includes applying a second transformation matrix to the second set of location data, said second transformation matrix different from said first transformation matrix.

6. A method according to claim 5, wherein: said first transformation matrix is derived from a first set of yaw, pitch and roll angles, said first set of yaw, pitch and roll angles defined between a first unit vector that corresponds to the first coordinate system and a third unit vector that corresponds to the third coordinate system; and said second transformation matrix is derived from a second set of yaw, pitch and roll angles, said second set of yaw, pitch and roll angles defined between a second unit vector that corresponds to the second coordinate system and the third unit vector.

7. An apparatus comprising: means for receiving a first set of location data using a first coordinate system that corresponds to a first building, said location data indicative of respective locations of objects within the first building;

means for receiving a second set of location data using a second coordinate system that corresponds to a second building, said second coordinate system different from said first coordinate system, said second building different from said first building, said second set of location data indicative of respective locations of objects within the second building;

means for generating a third set of location data from said first and second sets of location data by:

computing Euler angles for the first coordinate system relative to the third coordinate system by translating the first coordinate system so that it is co-located with the third coordinate system using vector subtraction; and transforming the location data indicative of respective locations of objects within the first building from the first coordinate system to the third coordinate system by multiplying one or more coordinate vectors associated with the first coordinate system by a first rotation operator associated with the first coordinate system computing Euler angles for the second coordinate system relative to the third coordinate system by translating the second coordinate system so that it is co-located with the third coordinate system using vector subtraction; and transforming the location data indicative of respective locations of objects within the second building from the second coordinate system to the third coordinate system by multiplying one or more coordinate vectors associated with the second coordinate system by a second rotation operator associated with the first coordinate system, the third coordinate system being different from the first and second coordinate systems, said third set of location data indicative of respective locations of said objects within the first building and within the second building in relation to said third coordinate system, wherein: the first set of location data includes data indicative of a location in the first building of at least one source of radio frequency (RF) signals; and the second set of location data includes data indicative of a location in the second building of at least one source of RF signals, further comprising: using the third set of location data as an input to an RF planning function; and adjusting a transmit power level of the at least one RF source based on the third set of location data.

8. An apparatus according to claim 7, wherein the first, second and third coordinate systems are all Cartesian coordinate systems.

9. An apparatus according to claim 8, wherein: the first coordinate system has a first origin; and the second coordinate system has a second origin different from the first origin.

10. An apparatus according to claim 9, wherein the third coordinate system has a third origin that is different from the first and second origins.

11. An apparatus according to claim 7, further comprising: means for performing an RF planning function using the third set of location data as an input.

12. An apparatus according to claim 7, wherein: said converting the first set of location data from the first coordinate system to the third coordinate system includes applying a first transformation matrix to the first set of location data; and said converting the second set of location data from the second coordinate system to the third coordinate system includes applying a second transformation matrix to the second set of location data, said second transformation matrix different from said first transformation matrix.

13. An apparatus according to claim 12, wherein: said first transformation matrix is derived from a first set of yaw, pitch and roll angles, said first set of yaw, pitch and roll angles defined between a first unit vector that corresponds to the first coordinate system and a third unit vector that corresponds to the third coordinate system; and said second transformation matrix is derived from a second set of yaw, pitch and roll angles, said second set of yaw, pitch and roll angles defined between a second unit vector that corresponds to the second coordinate system and the third unit vector.

14. An article of manufacture comprising: a computer usable medium having computer readable program code means embodied therein for performing RF planning for a campus, the computer readable program code means in said article of manufacture comprising:

computer readable program code means for receiving a first set of location data using a first coordinate system that corresponds to a first building, said location data indicative of respective locations of objects within the first building;

computer readable program code means for receiving a second set of location data using a second coordinate system that corresponds to a second building, said second coordinate system different from said first coordinate system, said second building different from said first building, said second set of location data indicative of respective locations of objects within the second building; and computer readable program code means for generating a third set of location data from said first and second sets of location data by:

computing Euler angles for the first coordinate system relative to the third coordinate system by translating the first coordinate system so that it is co-located with the third coordinate system using vector subtraction; and transforming the location data indicative of respective locations of objects within the first building from the first coordinate system to the third coordinate system by multiplying one or more coordinate vectors associated with the first coordinate system by a first rotation operator associated with the first coordinate system;

computing Euler angles for the second coordinate system relative to the third coordinate system by translating the second coordinate system so that it is co-located with the third coordinate system using vector subtraction; and transforming the location data indicative of respective locations of objects within the second building from the second coordinate system to the third coordinate system by multiplying one or more coordinate vectors associated with the second coordinate system by a second rotation operator associated with the first coordinate system, the third coordinate system being different from the first and second coordinate systems, said third set of location data indicative of respective locations of said objects within the first building and within the second building in relation to said third coordinate system, wherein: the first set of location data includes data indicative of a location in the first building of at least one source of radio frequency (RF) signals; and the second set of location data includes data indicative of a location in the second building of at least one source of RF signals, further comprising: using the third set of location data as an input to an RF planning function; and adjusting a transmit power level of the at least one RF source based on the third set of location data.

15. An article of manufacture according to claim 14, wherein the first, second and third coordinate systems are all Cartesian coordinate systems.

16. An article of manufacture according to claim 15, wherein: the first coordinate system has a first origin; and the second coordinate system has a second origin different from the first origin.

17. A method, comprising steps of:

providing, to a computer, a first set of location data using a first coordinate system that corresponds to a first building, said first set of location data comprising intra-first building RF planning data;

providing, to the computer, a second set of location data using a second coordinate system that corresponds to a second building, said second coordinate system different from said first coordinate system, said second building different from said first building, said second set of location data comprising intra-second building RF planning data;

generating, using the computer, a third set of location data from said first and second sets of location data by:

computing Euler angles for the first coordinate system relative to the third coordinate system by translating the first coordinate system so that it is co-located with the third coordinate system using vector subtraction; and transforming the location data indicative of respective locations of objects within the first building from the first coordinate system to the third coordinate system by multiplying one or more coordinate vectors associated with the first coordinate system by a first rotation operator associated with the first coordinate system;

computing Euler angles for the second coordinate system relative to the third coordinate system by translating the second coordinate system so that it is co-located with the third coordinate system using vector subtraction; and transforming the location data indicative of respective locations of objects within the second building from the second coordinate system to the third coordinate system by multiplying one or more coordinate vectors associated with the second coordinate system by a second rotation operator associated with the first coordinate system, wherein the third coordinate system is different from the first and second coordinate systems, said third set of location data comprising said intra-first building RF planning data, said intra-second building RF planning data, and inter-building RF planning data between said first and second buildings; and determining the potential for RF interference modeled by said inter-building RF planning data, wherein: the first set of location data includes data indicative of a location in the first building of at least one source of radio frequency (RF) signals; and the second set of location data includes data indicative of a location in the second building of at least one source of RF signals, further comprising: using the third set of location data as an input to an RF planning function; and adjusting a transmit power level of the at least one RF source based on the third set of location data.

18. A method according to claim 17, wherein the first, second and third coordinate systems are all Cartesian coordinate systems.

19. A method according to claim 18, wherein: the first coordinate system has a first origin; and the second coordinate system has a second origin different from the first origin.

20. A method according to claim 19, wherein the third coordinate system has a third origin that is different from the first and second origins.

21. A method according to claim 17, further comprising: using the third set of location data as an input to an RF planning function or to prescribe corrective actions to address current problems in network performance.

22. A method according to claim 17, wherein: said converting the first set of location data from the first coordinate system to the third coordinate system includes applying a first transformation matrix to the first set of location data; and said converting the second set of location data from the second coordinate system to the third coordinate system includes applying a second transformation matrix to the second set of location data, said second transformation matrix different from said first transformation matrix.

23. A method according to claim 22, wherein: said first transformation matrix is derived from a first set of yaw, pitch and roll angles, said first set of yaw, pitch and roll angles defined between a first unit vector that corresponds to the first coordinate system and a third unit vector that corresponds to the third coordinate system; and said second transformation matrix is derived from a second set of yaw, pitch and roll angles, said second set of yaw, pitch and roll angles defined between a second unit vector that corresponds to the second coordinate system and the third unit vector.

* * * * *